(12) United States Patent
Hara et al.

(10) Patent No.: US 9,875,828 B2
(45) Date of Patent: Jan. 23, 2018

(54) GROMMET

(71) Applicant: YAZAKI CORPORATION, Tokyo (JP)

(72) Inventors: Shugo Hara, Shizuoka (JP); Satoshi Uematsu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/440,790

(22) Filed: Feb. 23, 2017

(65) Prior Publication Data

US 2017/0271052 A1    Sep. 21, 2017

(30) Foreign Application Priority Data

Mar. 16, 2016 (JP) ................. 2016-052020

(51) Int. Cl.
*H01B 17/26* (2006.01)
*B60R 16/02* (2006.01)

(52) U.S. Cl.
CPC ......... *H01B 17/26* (2013.01); *B60R 16/0222* (2013.01)

(58) Field of Classification Search
CPC .............. H01B 17/26; B60R 16/0222
USPC ...................................... 174/153 G
See application file for complete search history.

(56) References Cited

U.S. PATENT DOCUMENTS 4,626,620 A * 12/1986 Plyler ................... H02G 3/083
                                                      174/153 G

FOREIGN PATENT DOCUMENTS

JP    2006-320161 A    11/2006
JP    2009-136107 A    6/2009

* cited by examiner

*Primary Examiner* — Dhirubhai R Patel
(74) *Attorney, Agent, or Firm* — Kenealy Vaidya LLP

(57) ABSTRACT

A grommet includes a grommet body having a cylindrical shape for passing through a wire therein and configured to be inserted and locked to a through hole formed in a sheet member and a cylindrical body provided on the grommet body and configured to branch the wire passed through the grommet body in at least two directions. The cylindrical body is provided with an easily bendable part at an inside of a bent part thereof, the easily bendable part suppressing swell of the inside of the bent part, when the cylindrical body is bent in a direction of bending a cylinder axis of the cylindrical body.

6 Claims, 5 Drawing Sheets

INSERTION DIRECTION

GROMMET

CROSS REFERENCE TO RELATED APPLICATION

This application is based on Japanese Patent Application (No. 2016-052020) filed on Mar. 16, 2016, the contents of which are incorporated herein by reference. Also, all the references cited herein are incorporated as a whole.

BACKGROUND

1. Technical Field

The present invention relates to a grommet.

2. Background Art

Conventionally, a grommet having a grommet body in a cylindrical shape which is inserted and locked to a through hole formed in a vehicle body panel and through which a wire harness is passed, and a cylindrical body which is provided on the grommet body and capable of branching the wire harness which is passed through the grommet body in two directions has been proposed (Reference should be made to JP-A-2009-136107 and JP-B-4353136 (JP-2006-320161), for example).

In the grommets described in JP-A-2009-136107 and JP-B-4353136, it is intended only to branch the wire harness which is passed through the grommet body in opposite two directions (the two directions separated at 180°), but it is not intended to bend the cylindrical body thereby to branch the wire harness, for example, in two directions which are separated at 90°. Therefore, in the grommets described in JP-A-2009-136107 and JP-B-4353136, in case where the cylindrical body is bent thereby to branch the wire harness, for example, in the two directions separated at 90°, the cylindrical body is compressed and swelled at an inside of a bent part, which makes a bending work difficult. Further, in case where the cylindrical body in a bent state is wrapped with a tape or the like to be fixed, a force for straightening the cylindrical body is exerted on the cylindrical body because of compression of the inside of the bent part, which makes it difficult to maintain the bent state.

It is to be noted that this problem is not limited to the grommet for vehicles, but this is also the problem common to the grommet to be used for other uses such as medical use, a robot, and so on. Therefore, the wire which is passed through the grommet is not limited to the wire harness.

The present invention has been made in order to solve the conventional problem as described above, and an object of the invention is to provide a grommet in which a cylindrical body provided on a grommet body can be easily bent and a bent state can be easily maintained.

SUMMARY

There is provided a grommet including:

a grommet body having a cylindrical shape for passing through a wire therein and configured to be inserted and locked to a through hole formed in a sheet member; and a cylindrical body provided on the grommet body and configured to branch the wire passed through the grommet body in at least two directions;

wherein the cylindrical body is provided with an easily bendable part at an inside of a bent part thereof, the easily bendable part suppressing swell of the inside of the bent part, when the cylindrical body is bent in a direction of bending a cylinder axis of the cylindrical body.

According to this grommet, because the cylindrical body is provided with the easily bendable part at the inside of the bent part for the purpose of suppressing or depressing swell of the inside of the bent part on occasion of bending the cylindrical body, the swell is depressed when the cylindrical body is bent, and hence, the cylindrical body can be easily bent. Moreover, because the swell is depressed, the compression at the inside of the bent part is moderated, thereby enabling the bent state to be easily maintained. As the results, it is possible to provide the grommet having the cylindrical body which is provided on the grommet body, in which the cylindrical body can be easily bent, and the bent state can be easily maintained.

For example, the cylindrical body includes a first arc-shaped piece and a second arc-shaped piece which are extended from the grommet body, and the easily bendable part includes a cut part which is cut away in a substantially V-shape from an end of the first arc-shaped piece positioned at the inside of the bent part of the cylindrical body toward a root side of the arc shape.

According to this grommet, the easily bendable part has the cut part which is cut away in a substantially V-shape from the end of the first arc-shaped piece, that is, the inside of the bent part of the cylindrical body, toward the root side of the arc shape. As the results, an area which is easily swelled on occasion of bending is cut away in the V-shape, and hence, the cylindrical body can be easily bent and an amount of the swell can be depressed. Accordingly, it is possible to provide the grommet in which the cylindrical body can be easily bent, and the bent state can be easily maintained.

For example, the easily bendable part has a plurality of slits which are formed from the end part of the first arc-shaped piece toward the root side of the arc shape, and the cut part is provided between the plurality of slits.

According to this grommet, the easily bendable part additionally has the plurality of slits which are formed from the end part of the first arc-shaped piece toward the root side of the arc shape. Therefore, a force for compressing the inside of the bent part on occasion of bending is relieved by the slits, which makes occurrence of the compression difficult, and accordingly, the cylindrical body can be easily bent. Moreover, because the cut part is provided between the plurality of slits, the cylindrical body can be easily bent with an aid of the cut part, at a position between the slits where a relief of the force is not present, and further, the amount of the swell can be depressed.

For example, the easily bendable part is a folded part which is folded in a V-shape so as to be recessed inward of the cylindrical body.

According to this grommet, the easily bendable part is the folded part which is folded in the V-shape so as to be recessed inward of the cylindrical body. Therefore, the cylindrical body can be made easily bendable at an apex of the V-shape as a starting point, on occasion of bending, and at the same time, the inside of the bent part is accustomed so as not to be swelled but to be recessed deep inside by the apex. As the results, it is possible to provide the grommet in which the cylindrical body can be easily bent, and the bent state can be easily maintained.

For example, the cylindrical body includes a first arc-shaped piece and a second arc-shaped piece which are extended from the grommet body, the folded part is provided on the first arc-shaped piece which is positioned at the inside of the bent part of the cylindrical body, and in a side view of the cylindrical body which is seen from a direction perpendicular to an insertion direction of the grommet body, while the first arc-shaped piece is in a natural state, an end part of the folded part out of the end parts of the first arc-shaped piece is separated from the grommet body to an opposite side in the insertion direction, as compared with the end parts of the first arc-shaped piece other than the end part of the folded part.

According to this grommet, the end part of the folded part is separated from the grommet body to the opposite side in the insertion direction, as compared with the ends outside the folded part, and hence, the first arc-shaped piece is shorter in end parts thereof in the longitudinal direction than in the center part. In this structure, an overlapped area between the first arc-shaped piece and the second arc-shaped piece is reduced in the end parts in the longitudinal direction. Accordingly, a tape wrapping work can be easily performed, when the cylindrical body in a state containing the wire W is wrapped with a tape. Therefore, it is possible to enhance workability of the tape wrapping work in the end parts of the cylindrical body in the longitudinal direction.

According to this invention, it is possible to provide the grommet in which the cylindrical body provided on the grommet body can be easily bent and the bent state can be easily maintained.

DETAILED DESCRIPTION OF THE EXEMPLARY EMBODIMENTS

Now, the invention will be described referring to preferred embodiments. It is to be noted that the invention is not limited to the below described embodiments, but can be appropriately modified within a scope not deviating from gist of the invention. Moreover, in the below described embodiments, illustration and description of structures are omitted in some parts. However, it is needless to say that concerning details of the omitted parts, the prior or well known arts are appropriately applied, within a scope where no discrepancy occurs with respect to the contents which will be described below.

Figure 1:
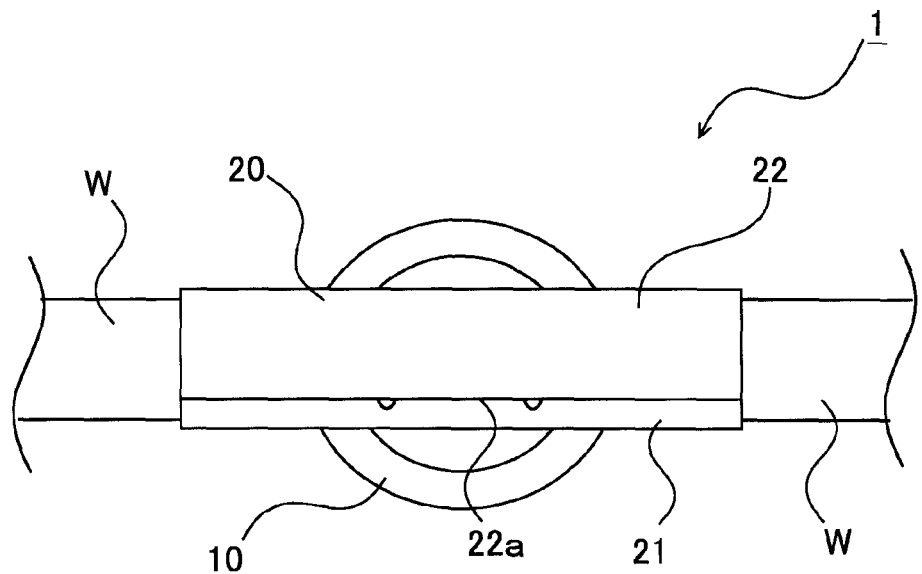
FIG. 1 is a plan view of a grommet in an embodiment according to the invention.
Figure 2:
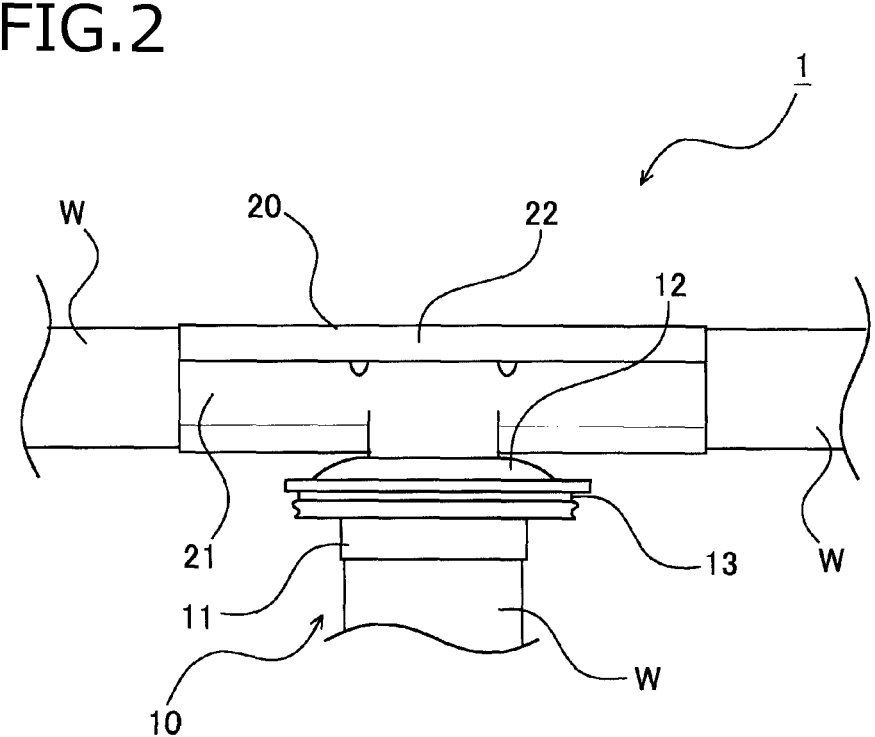
FIG. 2 is a side view of the grommet which is shown in FIG. 1.

FIG. 1 is a plan view showing a grommet in an embodiment according to the invention, and FIG. 2 is a side view of the grommet which is shown in FIG. 1. As shown in FIGS. 1 and 2, a grommet 1 in this embodiment is a wire exterior component which is inserted and locked to a through hole formed in a sheet member such as a vehicle body panel, and through which an electric wire W can be passed. Schematically, the grommet 1 is composed of a grommet body 10 and a cylindrical body 20.

The grommet body 10 is a resin member in a cylindrical shape which is inserted and locked to the through hole, and through which the wire W is passed. The grommet body 10 schematically has a reduced diameter part 11 and an enlarged diameter part 12. The reduced diameter part 11 is a cylindrical member which is smaller in diameter than the enlarged diameter part 12 and positioned at an end of the grommet 1 at the side to be inserted into the through hole. The enlarged diameter part 12 is a cylindrical member which is larger in diameter than the reduced diameter part 11, and continued to one end of the reduced diameter part 11. This enlarged diameter part 12 has a lock part 13 in a form of an annular groove. By engaging this lock part 13 with the through hole in the sheet member, the grommet 1 is brought into the state inserted and locked to the through hole.

The cylindrical body 20 is a resin member which is provided on the grommet body 10, for the purpose of branching the wire W which is passed through the grommet body 10 in two directions. In this embodiment, the cylindrical body 20 includes an arc-shaped piece 21 at one side and another arc-shaped piece 22 at the other side, both having an arc shape in section, and extended from the grommet body 10. By combining and uniting these arc-shaped pieces 21, 22 to each other, the cylindrical body 20 is formed.

Figure 3:
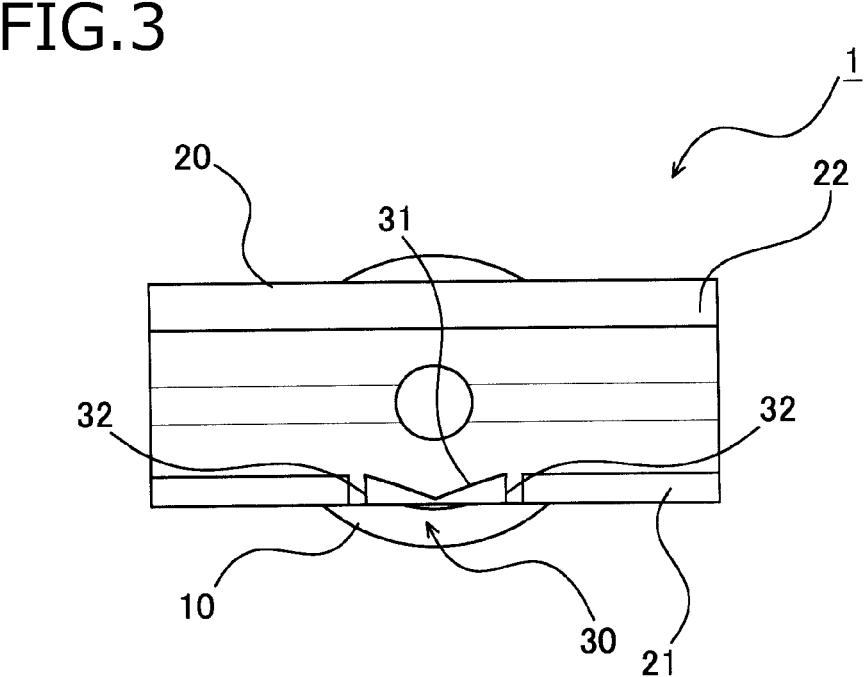
FIG. 3 is a plan view showing the grommet which is shown in FIG. 1, in a state where arc-shaped pieces of the grommet are not united to each other.
Figure 4:
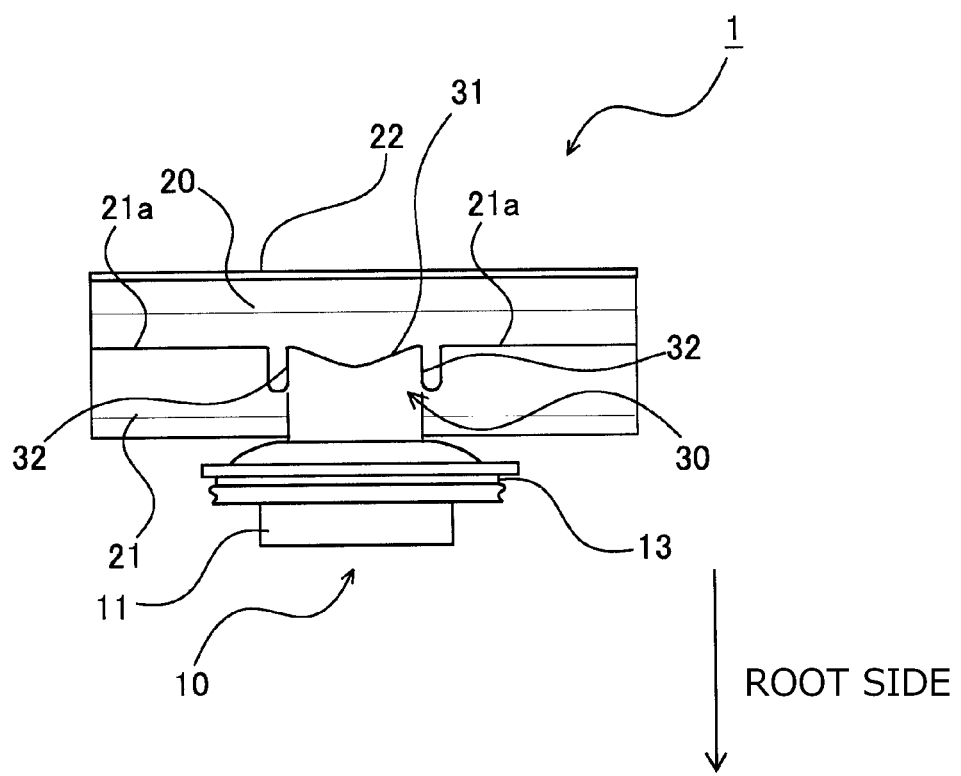
FIG. 4 is a structural view showing the grommet which is shown in FIG. 1, in a state where the arc-shaped pieces of the grommet are not united to each other.
Figure 5:
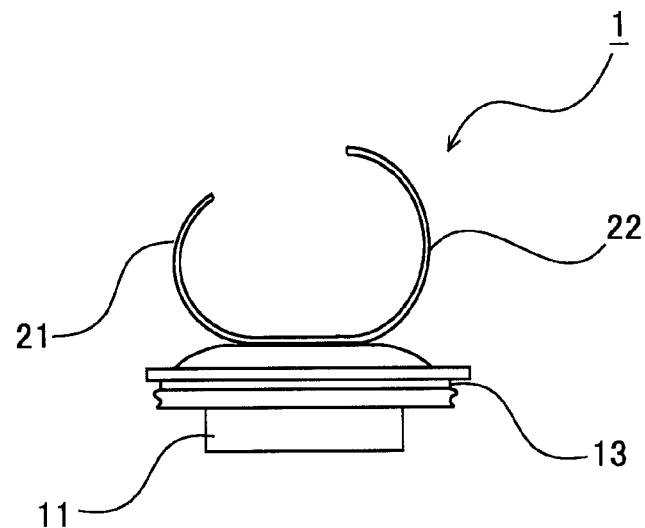
FIG. 5 is a structural view showing the grommet which is shown in FIG. 1, in a state where the arc-shaped pieces of the grommet are not united to each other.

FIGS. 3 to 5 are structural views showing the grommet which is shown in FIG. 1 in a state where the arc-shaped pieces 21, 22 of the grommet are not united to each other. FIG. 3 is a plan view, FIG. 4 is a view as seen from a direction of an arrow mark A in FIG. 3, and FIG. 5 is a view as seen from a direction of an arrow mark B in FIG. 3.

In this embodiment, the cylindrical body 20 is formed by overlapping one of the arc-shaped pieces 21, 22 on the other, and then, by wrapping them with a tape. As shown in FIGS. 3 to 5, the arc-shaped piece 22 at the other side is formed longer than the arc-shaped piece 21 at the one side. For this reason, the arc-shaped piece 22 at the other aide is overlapped on the arc-shaped piece 21 at the one side, and thereafter, they are wrapped with the tape.

In this embodiment, one of the arc-shaped pieces 21, 22 is overlapped on the other, and wrapped with the tape thereby to be united to form the cylindrical shape as an outer shape. However, the invention is not limited to this, but the both pieces may be united, using predetermined locking parts or locking devices. Moreover, the cylindrical body 20 is not limited to the one which is formed by uniting the arc-shaped pieces 21, 22 to each other. For example, as shown in FIG. 4 of JP-A-2009-136107 and so on, the cylindrical body 20 may be formed in such a manner that a rectilinear slit is formed in a longitudinal direction of a cylindrical member, to define the arc-shaped piece 21 at one side and the arc-shaped piece 22 at the other side, and they are formed into a substantially cylindrical shape in a natural state.

Further, in this embodiment, the arc-shaped piece 22 at the other side is formed longer (higher) than the arc-shaped piece 21 at the one side. In this manner, an arrangement corresponding to a water receiving direction can be performed, and hence, water proofing performance can be enhanced. For example, in the embodiment as shown in FIG. 1, the cylindrical body 20 is so arranged as to receive water such as rain from an upper side in the drawing. The arc-shaped piece 22 at the other side is formed longer than the arc-shaped piece 21 at the one side, and covered over the arc-shaped piece 21 at the one side. In this manner, waterproofing can be favorably realized, because an end part 22a of the arc-shaped piece 22 at the other side is hardly subjected to the water, and further, the arc-shaped piece 21 at the one side is not placed at an upper position.

Figure 6:
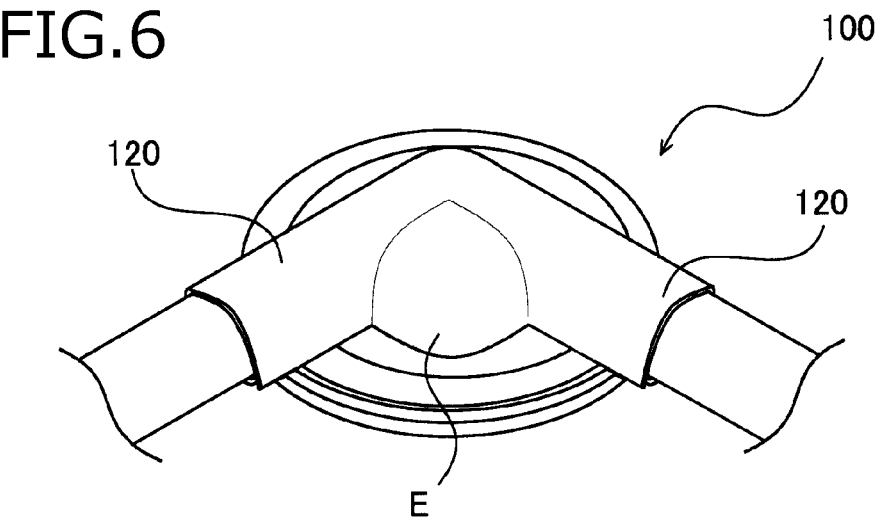
FIG. 6 is a perspective view showing a grommet in a comparative example, in a state where a cylindrical body is bent.

Herein, a grommet in a comparative example will be described. FIG. 6 is a perspective view showing the grommet in the comparative example, in a state where the cylindrical body is bent. As shown in FIG. 6, in a grommet 100 in the comparative example, a cylindrical body 120 is not provided with an easily bendable part 30 which will be described below. Therefore, in case where the cylindrical body 120 is bent in a direction of a plane of the sheet member which is formed with the through hole (that is, a direction along a plane perpendicular to an insertion direction of the grommet into the through hole), the cylindrical body 120 is compressed at an inside of the bent part and a swelled part E is formed, which makes it difficult to realize a bent shape. Moreover, even though the cylindrical body 120 is wrapped with the tape or the like to be fixed in a bent state, a force for straightening the cylindrical body 120 is exerted because of compressed state of the swelled part E, which makes it difficult to maintain the bent shape.

In view of the above, the cylindrical body 20 in the present embodiment is provided with the easily bendable part 30. The easily bendable part 30 is a functional part for depressing swell of the inside of the bent part when the cylindrical body 20 is bent in a direction of bending a cylinder axis (the direction of the plane of the sheet member, in this embodiment).

Specifically, as shown in FIGS. 3 and 4, the easily bendable part 30 includes a cut part 31 which is formed in a substantially V-shape from an end part 21a of the arc-shaped piece 21 at the one side, which is at the inside of the bent part of the cylindrical body 20, toward a root side of the arc shape. Further, the easily bendable part 30 has a plurality of (two) slits 32 which are extended from the end part 21a of the arc-shaped piece 21 at the one side toward the root side of the arc shape, and the cut part 31 is formed between a plurality of the slits 32.

Figure 7:
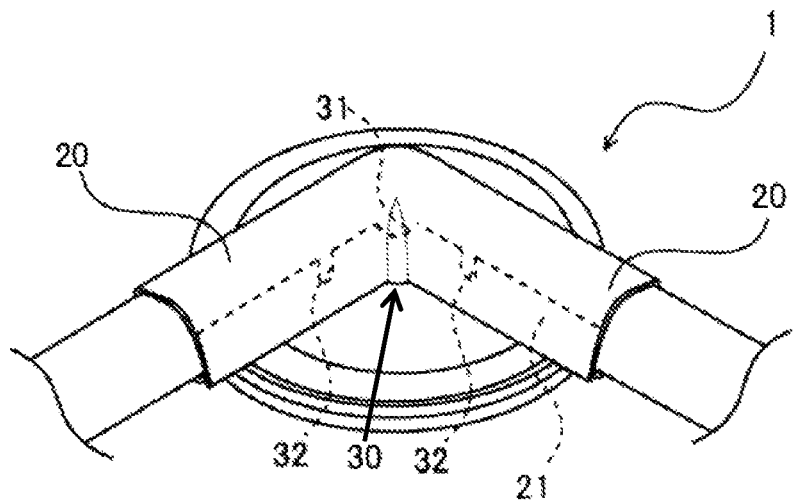
FIG. 7 is a perspective view showing the grommet which is shown in FIG. 1, in a state where a cylindrical body is bent.

Then, operation of the grommet 1 in this embodiment will be described. FIG. 7 is a perspective view showing the grommet which is shown in FIG. 1, in a state where the cylindrical body 20 is bent. As shown in FIG. 7, in the grommet 1 in this embodiment, the cylindrical body 20 is bent so that the arc-shaped piece 21 at the one side is positioned inside of the bent part. In this embodiment, the cut part 31 which is cut away in a substantially V-shape is formed in the arc-shaped piece 21 at the one side, and an area which is easily swelled on occasion of bending is cut away in the V-shape. As the results, the inside of the bent part is hardly swelled on occasion of bending, and hence, the cylindrical body 20 can be easily bent. Moreover, because an amount of the swell is depressed, it is possible to easily maintain the bent state.

Further, a plurality of the slits 32 are formed in the arc-shaped piece 21 at the one side. For this reason, a force for compressing the inside of the bent part on occasion of bending is relieved by the slits 32, and the compression will hardly occur. Consequently, it is possible to allow the cylindrical body 20 to be easily bent. Moreover, because the compression hardly occurs, the amount of the swell at the inside of the bent part is depressed, and the bent state can be easily maintained. Particularly, by adequately selecting sizes of the slits 32, the inside of the bent part is hardly swelled, as shown in FIG. 7, thus enabling the arc-shaped piece 22 at the other side to be brought into substantially tight contact with the wire.

As described above, according to the grommet 1 in this embodiment, because the cylindrical body 20 is provided with the easily bendable part 30 at the inside of the bent part for the purpose of depressing swell of the inside of the bent part on occasion of bending the cylindrical body 20, the swell is depressed when the cylindrical body 20 is bent, and hence, the cylindrical body 20 can be easily bent. Moreover, because the swell is depressed, the compression at the inside of the bent part is moderated, thereby enabling the bent state to be easily maintained. As the results, it is possible to provide the grommet 1 in which the cylindrical body 20 provided on the grommet body 10 can be easily bent, and the bent state can be easily maintained.

Moreover, the easily bendable part 30 has the cut part 31 which is cut away in a substantially V-shape from the end part 21a of the arc-shaped piece 21 at the one side, that is, the inside of the bent part of the cylindrical body 20, toward the root side of the arc shape. As the results, the area which is easily swelled on occasion of bending is cut away in the V-shape, and hence, the cylindrical body 20 can be easily bent and the amount of the swell can be depressed. Accordingly, it is possible to provide the grommet 1 in which the cylindrical body 20 can be easily bent, and the bent state can be easily maintained.

In addition, the easily bendable part 31 has a plurality of the slits 32 which are formed from the end part 21a of the arc-shaped piece 21 at the one side toward the root side of the arc shape. Therefore, a force for compressing the inside of the bent part on occasion of bending is relieved by the slits 32, which makes occurrence of the compression difficult, and accordingly, the cylindrical body 20 can be easily bent. Moreover, because the cut part 31 is formed between a plurality of the slits 32, the cylindrical body 20 can be easily bent with an aid of the cut part 31, at a position between the slits 32 where a relief part of the force is not present, and further, the amount of the swell can be depressed.

Then, the grommet in a second embodiment will be described. The grommet in the second embodiment is substantially the same as the one in the first embodiment, but partly different in structure. The difference from the first embodiment will be described below. It is to be noted that the same structure as in the first embodiment will be denoted with the same reference numerals.

Figure 8:
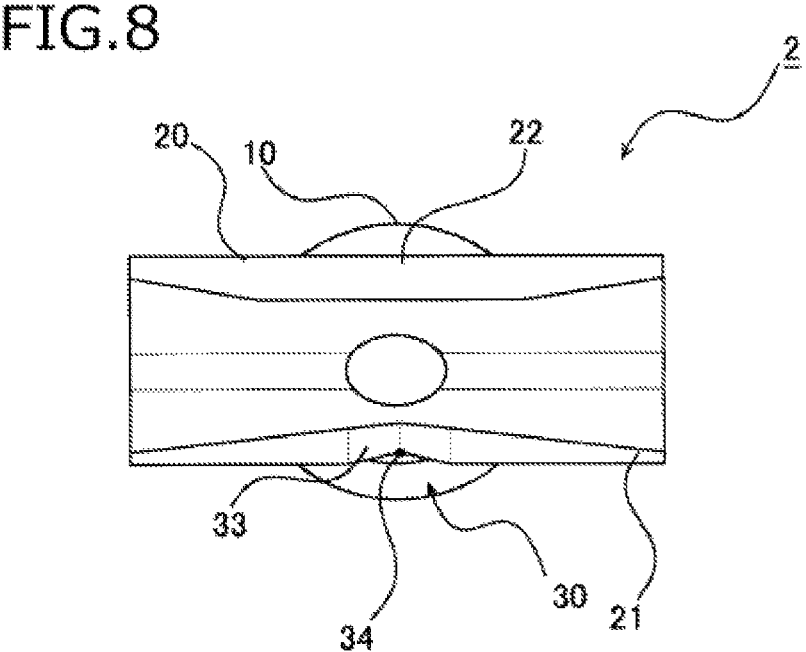
FIG. 8 is a plan view showing the grommet in a second embodiment, in a state where the arc-shaped pieces of the grommet are not united to each other.
Figure 9:
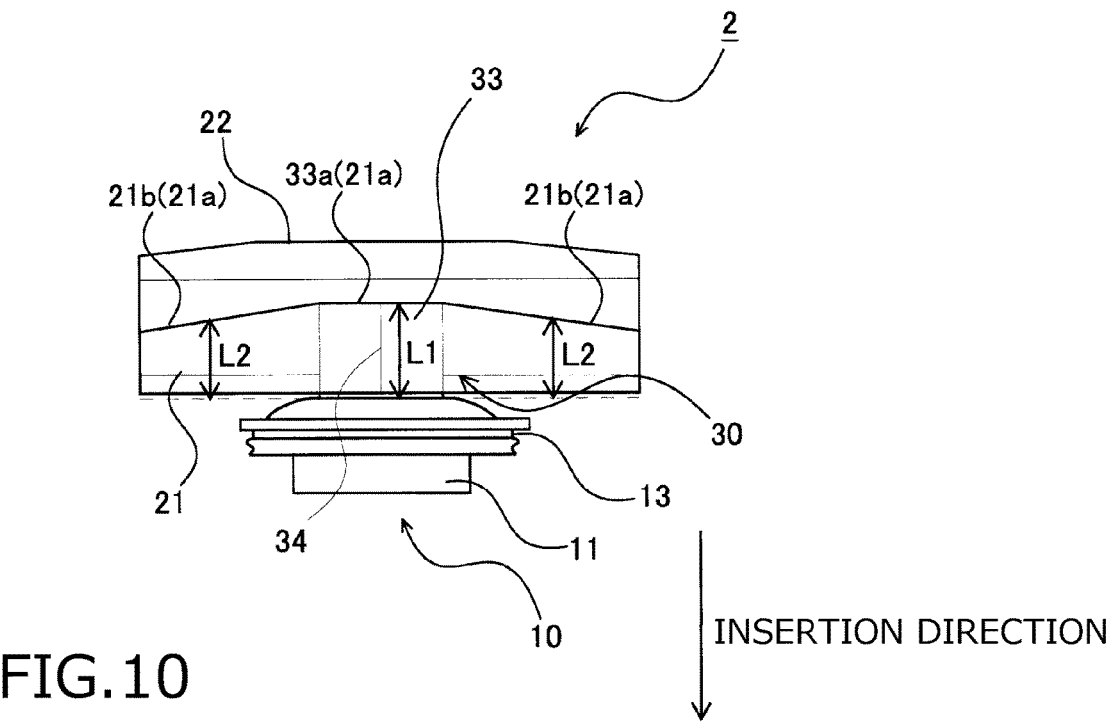
FIG. 9 is a structural view showing the grommet in the second embodiment, in the state where the arc-shaped pieces of the grommet are not united to each other, and a view as seen from a direction of an arrow mark A in FIG. 8.
Figure 10:
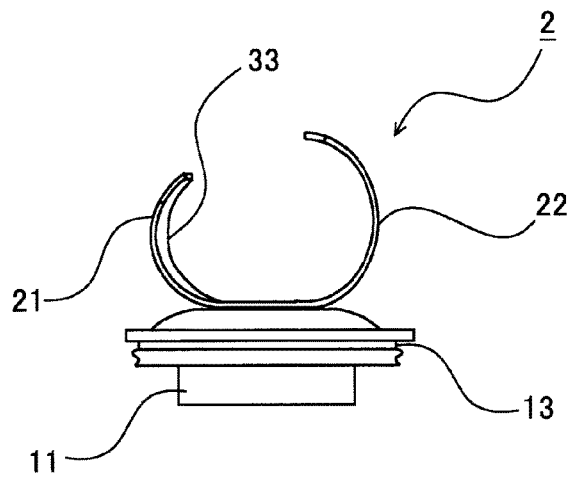
FIG. 10 is a structural view showing the grommet in the second embodiment, in the state where the arc-shaped pieces of the grommet are not united to each other, and a view as seen from a direction of an arrow mark B in FIG. 8.

FIGS. 8 to 10 are structural views showing the grommet in the second embodiment, in a state where the arc-shaped pieces 21, 22 of the grommet are not united to each other. FIG. 8 is a plan view, FIG. 9 is a view as seen from a direction of an arrow mark A in FIG. 8, and FIG. 10 is a view as seen from a direction of an arrow mark B in FIG. 8.

As shown in FIGS. 8 to 10, the easily bendable part 30 includes a folded part 33 which is folded in a V-shape so as to recessed inward of the cylindrical body 20. The folded part 33 has an apex 34 because of the V-shape, and this apex 34 is a starting point of the folding. Although the folded part 33 is formed in the arc-shaped piece 21 at the one side, it is also possible to form the folded part 33 in the arc-shaped piece 22 at the other side.

Further, as shown in FIGS. 8 to 10, the arc-shaped piece 21 at the one side and the arc-shaped piece 22 at the other side are formed longer in the center part than in the end parts in the longitudinal direction. Describing the arc-shaped piece 21 at the one side, as an example, in a side view of the cylindrical body 20 which is seen from a direction perpendicular to an insertion direction of the grommet body 10, while the arc-shaped piece 21 at the one side is in a natural state (that is, in a state as shown in FIG. 9), an end part 33a of the folded part 33 out of the ends 21a of the arc-shaped piece 21 at the one side is separated from the grommet body 10 to an opposite side in the insertion direction, as compared with the ends 21b outside the folded part 33.

Specifically describing, the end part 33a of the folded part 33 is separated from the grommet body 10 by a length L1 to the opposite side in the insertion direction. In contrast, the ends 21b outside the folded part 33 are separated from the grommet body 10 by a length L2 (<L1) to the opposite side in the insertion direction. Accordingly, in case where the reduced diameter part 11 is located at a lower side, the end part 33a of the folded part 33 is positioned higher than the ends 21b outside the folded part 33. This is the same with the arc-shaped piece 22 at the other side. In this manner, workability of tape wrapping work is enhanced.

Then, operation of the grommet 2 in the second embodiment will be described. In the grommet 2 in the second embodiment, the cylindrical body 20 is bent so that the arc-shaped piece 21 at the one side is positioned inside of the bent part. In this embodiment, the folded part 33 which is folded in a V-shape so as to be recessed inward of the cylindrical body 20 is formed in the arc-shaped piece 21 at the one side. As the results, the apex 34 becomes the starting point of the folding, on occasion of bending, enabling the cylindrical body 20 to be easily bent. Moreover, after it is bent, the inside of the bent part is accustomed so as not to be swelled but to be recessed deep inside, by the apex 34. Accordingly, the bent state can be easily maintained.

When the cylindrical body 20 which contains the wire is wrapped with the tape, a wrapping work must be carried out, while an overlapped area between the arc-shaped piece 21 at the one side and the arc-shaped piece 22 at the other side is kept in a tightly overlapped state. For this reason, in case where an overlapped area becomes larger, the number of securing positions is increased, for the purpose of keeping the overlapped state of the larger overlapped area, and workability of the wrapping work is likely to be deteriorated. However, in the grommet 2 in the second embodiment, the arc-shaped piece 21 at the one side and the arc-shaped piece 22 at the other side are formed longer in the center parts thereof than in the end parts thereof in the longitudinal direction, and therefore, the wrapping work can be easily carried out in the end parts in the longitudinal direction which are important positions for the tape wrapping. As the results, the workability of the wrapping work is enhanced.

In this manner, according to the grommet 2 in the second embodiment, it is possible to provide the grommet 2 in which the cylindrical body 20 provided on the grommet body 10 can be easily bent, and the bent state can be easily maintained, in the same manner as in the first embodiment.

Moreover, according to the grommet 2 in the second embodiment, the easily bendable part 30 is the folded part 33 which is folded in the V-shape so as to be recessed inward of the cylindrical body 20. As the results, the easily bendable part 30 can be made easily bendable at the apex 34 as the starting point, on occasion of bending, and at the same time, the inside of the bent part is accustomed so as not to be swelled but to be recessed deep inside by the apex 34, after it is bent. Therefore, it is possible to provide the grommet 2 in which the cylindrical body 20 can be easily bent, and the bent state can be easily maintained.

Further, the end part 33a of the folded part 33 is separated from the grommet body 10 to the opposite side in the insertion direction than the ends 21b outside the folded part 33, and hence, the arc-shaped piece 21 at the one side is shorter in the end parts in the longitudinal direction than in the center part. By forming the arc-shaped pieces 21 in this manner, the overlapped area between the arc-shaped piece 21 at the one side and the arc-shaped piece 22 at the other side is reduced in the end parts in the longitudinal direction. Accordingly, when the cylindrical body 20 which contains the wire W is wrapped with the tape, the tape wrapping work can be easily performed. Therefore, it is possible to enhance workability of the tape wrapping work at the end sides of the cylindrical body 20 in the longitudinal direction.

Although the present invention has been heretofore described, referring to the embodiments, the invention is not limited to the above described embodiments. Modifications may be added to the embodiments in a scope not deviating from gist of the invention, or the embodiments may be combined together. Alternatively, the embodiments may be combined with other arts such as the prior arts.

For example, in the above described embodiments, the easily bendable part 30 is formed on the side face of the cylindrical body 20 (at the position inside of the bent part), for the purpose of bending the cylindrical body 20 in a direction of the plane of the sheet member. However, in the grommet 1 in which the cylindrical body 20 is intended to be bent in a direction separated from the sheet member, the easily bendable part 30 is formed on an upper face of the cylindrical body 20 (an opposite side to the grommet body 10, which is the position inside of the bent part). In short, in the above described embodiments, the bending direction of the cylindrical body 20 is not particularly limited.

In the above described embodiments, an example in which the cylindrical body 20 in a straight shape is bent has been described. However, the invention is not limited to this example, but the cylindrical body 20 which has been bent at an angle of 90° in advance may be bent into a straight shape. In short, the shape of the cylindrical body 20 before bending is not limited to the straight shape.

Moreover, in the above described first embodiment, the number of the slits 32 is two. However, the number is not limited to this, but may be three or more. In case where the easily bendable part has the three or more slits 32, the cut parts 31 have only to be arranged at either one or more positions between the three or more slits 32.

Further, in the above described embodiments, the easily bendable part 30 is provided at only one position on the cylindrical body 20. However, the invention is not limited to this, but the easily bendable parts 30 may be provided at a plurality of positions. For example, a plurality of the easily bendable parts 30 may be provided in the arc-shaped piece 21 at the one side or one each (may be a plurality of) of the easily bendable part 30 may be provided in the arc-shaped piece 21 at the one side and in the arc-shaped piece 22 at the other side.

Further, in the above described embodiments, because the cylindrical body 20 is in a form of a single tube, it is possible to branch the wire W in the two directions. However, the invention is not limited to this, but the cylindrical body 20 may be in a form of a trifurcated tube so that the wire W can be branched in three or more directions.

What is claimed is:

1. A grommet comprising:
   a grommet body having a cylindrical shape for passing through an end of a wire therein and configured to be inserted and locked to a through hole formed in a sheet member; and
   a cylindrical body defining at least two ends is provided on the grommet body and configured to branch the end of the wire passed through the grommet body in at least two directions;
   wherein at least one of the at least two ends of the cylindrical body is configured to be bent in a direction of bending a cylinder axis of the cylindrical body to form a bent part thereof, the cylindrical body being provided with an easily bendable part at an inside of the bent part that suppresses swell at the inside of the bent part upon bending the cylindrical body.

2. The grommet according to claim 1, wherein the cylindrical body includes a first arc-shaped piece and a second arc-shaped piece which are extended from the grommet body; and
   wherein the easily bendable part includes a cut part which is cut away in a substantially V-shape from an end of the first arc-shaped piece positioned at the inside of the bent part of the cylindrical body toward a root side of the arc shape.

3. The grommet according to claim 2, wherein the easily bendable part has a plurality of slits which are formed from the end part of the first arc-shaped piece toward the root side of the arc shape, and the cut part is provided between the plurality of slits.

4. The grommet according to claim 1, wherein the easily bendable part is a folded part which is folded in a V-shape so as to be recessed inward of the cylindrical body.

5. The grommet according to claim 4, wherein the cylindrical body includes a first arc-shaped piece and a second arc-shaped piece which are extended from the grommet body;
   wherein the folded part is provided on the first arc-shaped piece which is positioned at the inside of the bent part of the cylindrical body; and
   wherein in a side view of the cylindrical body which is seen from a direction perpendicular to an insertion direction of the grommet body, while the first arc-shaped piece is in a natural state, an end part of the folded part out of the end parts of the first arc-shaped piece is separated from the grommet body to an opposite side in the insertion direction, as compared with the end parts of the first arc-shaped piece other than the end part of the folded part.

6. The grommet according to claim 1, wherein the direction of bending the cylinder axis of the cylindrical body is a direction along a plane being substantially perpendicular to an extending direction of the grommet body.

* * * * *